United States Patent [19]

Montavon

[11] 3,989,603

[45] Nov. 2, 1976

[54] METHOD OF MANUFACTURING WATCH DIALS AND WATCH DIALS PRODUCED BY THIS METHOD

[76] Inventor: Denis Montavon, Haut-du-Village 13, 2905 Courtedoux, Switzerland

[22] Filed: Nov. 25, 1974

[21] Appl. No.: 527,160

[30] Foreign Application Priority Data

Nov. 29, 1973 Switzerland ....................... 16779/73

[52] U.S. Cl. ................................ 204/18 R; 29/177; 58/127 R

[51] Int. Cl.[2] ....................... B44C 1/04; B23P 13/00; G04B 19/06

[58] Field of Search ..................... 58/127 R; 29/177; 204/18 R

[56] References Cited

UNITED STATES PATENTS

| | | | |
|---|---|---|---|
| 2,071,240 | 2/1937 | Spencer et al. | 204/18 R X |
| 2,594,820 | 4/1952 | Stern | 204/18 R |
| 2,604,418 | 7/1952 | Stern | 58/127 R |

FOREIGN PATENTS OR APPLICATIONS

| | | | |
|---|---|---|---|
| 313,198 | 3/1956 | Switzerland | 58/127 R |

*Primary Examiner*—George H. Miller, Jr.

[57] ABSTRACT

A method of manufacturing a watch dial with symbols in relief wherein a plate of aluminum-base material, not yet provided with reliefs, first undergoes a basic anodizing treatment, then relief elements are formed by an embossing operation so that the aluminum-base material of the plate appears, free of oxidizing, on all visible side surfaces of the embossed relief elements, the tenacious nature of the anodizing ensuring a clear and crackless demarcation between these bared side surfaces and the remaining anodized surface of the plate. The oxidized layer is then removed from the upper surface of the relief elements so that both the upper and side surfaces of each relief element are bared. A second anodizing treatment is then applied to the bared surfaces for imparting to them a particular aspect, different from the one given by the basic anodizing, thus confering upon these relief elements the appearance of real appliques.

9 Claims, 5 Drawing Figures

METHOD OF MANUFACTURING WATCH DIALS AND WATCH DIALS PRODUCED BY THIS METHOD

Figure 1:
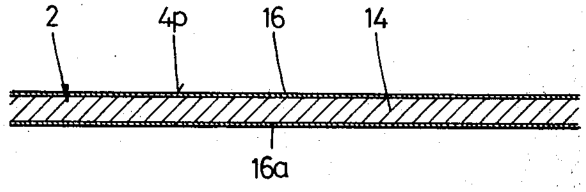

This invention relates to a method of manufacturing watch dials having indicia in relief and to watch dials produced by this method.

Watch dials are already known having repousse indicia which are embossed in a plate which may be made of various materials. Once the indicia have been embossed, it is known to color the plate by diverse methods, then to give a different coloring just to the top surfaces of the repousse indicia. According to the coloring method used, the layer of coloring on the top surfaces of the indicia may first be removed, e.g., by diamond polishing. At first glance, this type of dial does give the impression of being provided with applique indicia, but upon closer examination, it will be realized that they are not appliqued after all because the sides of the indicia are not the same color as their top surfaces but rather the same color as the background. Moreover, the materials used heretofore for manufacturing this type of dial did not lend themselves to making the dials particularly attractive, e.g., by means of a relief-like design in the middle of the dial plate.

U.S. Pat. No. 2,594,820 proposes a process for manufacturing timepiece dials comprising the following steps: an aluminum plate is stamped to produce indicia in relief; the plate is subjected to an anodic oxidizing treatment and simultaneously undergoes a coloring treatment; the raised indicia are polished until the oxide coating covering them is eliminated; a metallic coating of a different appearance than the background of the dial is deposited on the indicia.

According to this U.S. patent, however, because the plate is stamped before being subjected to the oxidation treatment, the sides of the raised indicia are not automatically laid bare. It is stated in the specification that the upper surface of the indicia is polished or burnished to remove its oxide coating, but nothing is said about removing the oxide coating on the sides of the indicia. It appears from FIG. 4 of this U.S. patent that the oxide coating is also removed from the sides, but that contradicts what is stated in the specification. In any event, even if the sides were laid bare according to this prior disclosure, that would not take place automatically, and it would have to be assumed that they are at best exposed by burnishing or an analogous method, which would certainly prove to be very difficult as far as the sides are concerned. Furthermore, that would not agree with the specification, and it is certain that this prior disclosure does not provide any easy and convenient solution for obtaining indicia with identical upper and side surfaces.

Swiss Pat. No. 335,117 teaches a method of manufacturing a timepiece dial comprising the following steps: an aluminum plate is stamped to yield indicia in relief; the plate undergoes a first anodic oxidation and is then covered with an insulating coating; the contour edge of the plate is exposed; the indicia are polished; the plate undergoes a second anodic oxidation during which only the indicia are oxidized.

In this prior-art method, there is an embossing operation before the first dyeing, then a blanking operation after dyeing. However, the operation carried out after the first dyeing is intended solely to cut the contour of dial to the proper size while baring the edge of it so as to obtain an electrical contact location for the second dyeing step. This indicia, however, are already stamped in relief before the first dyeing, so that if their sides are once more exposed when the second dyeing takes place, this can only have been done by means of a relatively difficult operation; moreover, the specification of this old Swiss patent, which does not include any drawings, says absolutely nothing in this regard. Thus this prior disclosure does not go beyond what has previously been stated concerning the prior art.

Finally, Swiss Pat. No. 498,834 teaches a method of manufacturing a watch dial comprising the following steps: a plate made of brass, not aluminum, is covered with a galvanic coating, then with varnish; the plate is subjected to a stamping operation to form indicia in relief, the base of each symbol having been cut during this operation so that its sides are no longer covered with varnish; the upper face of each symbol is faceted, the dial is passed into a galvanic bath, and the coating obtained adheres to the sides and to the upper face of the symbol.

This older process, however, is expressly concerned with a dial formed from a brass plate, and the plate subjected to stamping is first covered only with coating which, unlike the anodic oxidation of an aluminum plate, is not particularly formed to exhibit good tenacity. Thus no line of demarcation which is clear-cut and free of cracks is obtained at the foot of the sides, between the anodized background and the bare sides. Hence this method presents the drawback of not ensuring that the indicia in relief have the perfect appearance of real applique members because of the inevitable cracks along the aforementioned line of demarcation—a drawback which certainly does not appear in the case of true appliques. Nothing in this prior disclosure suggest the use of an anodic coloring process ensuring a far superior tenacity, and this would not even be possible with the brass plate used in this older method. Nor is there any suggestion of taking advantage of different properties exhibited by other coloring methods applied to other metals. Even considering this prior disclosure in view of the other two prior disclosures mentioned above, there is no suggestion of a method utilizing the high tenacity of an anodic oxidation of the aluminum since neither of the two other disclosures in question mentions this particular property, which would present no advantage for those two methods in any case.

Therefore, even in connection with the two other prior disclosures mentioned, Swiss Pat. No. 498,434 also does not provide any solution to the problem of producing, in a very simple manner, an inexpensive dial which is certain to have the luxurious appearance of a dial provided with real applique indicia.

It is the object of this invention to provide a dial and a method of manufacturing such a dial which, while inexpensive, ensures that the dial will have the elegant look of one bearing true applique indicia and in addition makes it possible to render it even more attractive by means of various discreet designs, e.g., by marbling the surface of the dial.

To this end, the method of manufacturing watch dials according to the present invention using a plate made of an anodically oxidizable aluminum-base material, intended to form the dial, and not yet provided with any elements in relief, comprises the steps of applying to the plate a basic surface treatment of anodic oxidation; subjecting it thereafter to an embossing operation whereby the desired relief elements are formed and the material of the plate is caused to appear in its natural bare state, without surface treatment, on all visible sides of the embossed relief elements, the incrusting nature and tenacity of the anodizing ensuring a clear-cut, crack-free line of demarcation at the foot of these sides, between the anodized background and the bare sides; removing the coating resulting from the basic anodizing surface treatment from the top surfaces of the relief elements to cause the plate material to appear bare there as well; and utilizing the bared top surface and bared sides of the relief elements to give them a particular aspect which, by being present on the sides of the relief elements as well, confers upon them the appearance of true applique elements standing out from the remainder of the dial surface which exhibits another aspect resulting from the basic surface treatment.

Likewise in accordance with this invention, in order to utilize the baring of the top surface and sides of the raised elements in order to give them the mentioned particular aspect, a second anodizing surface treatment is carried out, different from the first basic treatment, in a manner which, without affecting the non-bared surface portions, affects the bared top surface and bared sides of the raised elements to give them the particular aspect which makes them look like appliques, the character of which is provided by the second anodizing treatment, standing out from a background having an appearance resulting from the first basic anodizing treatment.

With the object of obtaining a particularly attractive dial, still in accordance with the invention, a design may be created on the plate prior to the basic surface treatment by selective masking and etching of the unmasked portions. The design will appear in the form of smooth, non-etched portions and rough etched portions, and after the basic surface treatment, this design will remain in the form of marbling in the aspect of the finished dial.

Thus in one preferred embodiment of this invention, the watch dial resulting from this method is formed of an aluminum plate having embossed indicia, the top surface and sides of these indicia being anodized with a coloring or an aspect, and the remainder of the dial face being anodized with another coloring or another aspect.

Figure 2:
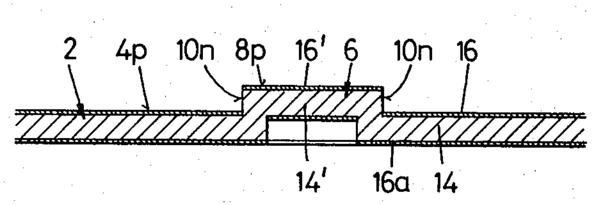
Figure 3:
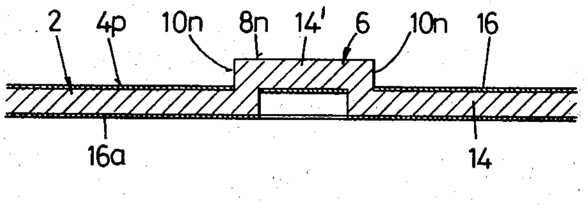

Other objects and advantages of the invention will become apparent from the following detailed description of a preferred embodiment thereof, taken in conjunction with the accompanying drawings, in which:

FIG. 1 is a diagrammatic cross-section of a dial plate in a first stage of manufacture of a dial, FIG. 2 is a cross-section analogous to FIG. 1 of the same dial plate in a more advanced stage of manufacture, FIG. 3 is a cross-section analogous to FIGS. 1 and 2 of the same dial plate in a still more advanced stage of manufacture, which stage may, in certain cases of manufacture of a cheap dial, even constitute the stage of the finished dial.

Figure 4:
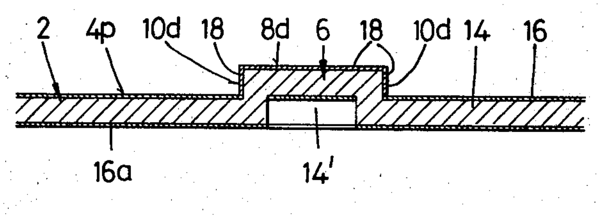
Figure 5:
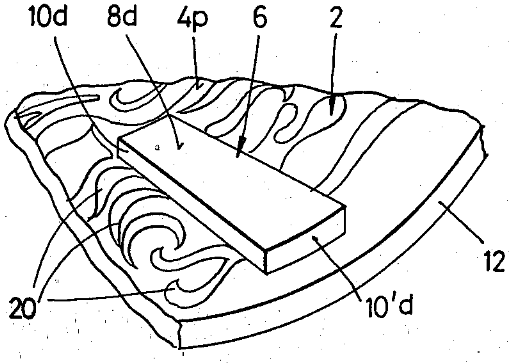

FIG. 4 is a cross-section analogous to FIGS. 1–3 of the dial plate in its final state where it constitutes a fine-quality dial, a further surface treatment having been applied to some portions of it subsequent to the stage shown in FIG. 3, and FIG. 5 is a perspective view of a portion of the finished dial obtained by the method illustrated in FIGS. 1–4, which dial bears elements in relief (only one of which is visible in FIG. 5) which have the same esthetic appearance as true appliques, an smooth/rough design exhibited by the background of the dial also being shown in FIG. 5.

In order clearly to understand the method of manufacture illustrated in FIGS. 1–4, it will be well to start by examining FIG. 5, which shows a portion of the dial manufactured by this method. It will be seen to comprise a dial plate 2, the visible surface **4*p* of which exhibits a certain basic aspect, elements 6 in relief (only one of which is shown in FIG. 5) being disposed on surface 4*p* of plate 2 so as to provide the appearance of true appliques. For this purpose, both the top surface 8*d* of elements 6 and the surface of their sides 10*d* (lateral faces) and 10'*d* (end faces) are treated so as to exhibit a different aspect from that of surface 4*p*, top surface 8*d* and side surfaces 10*d* and 10'*d* all having the same aspect, so as to give raised elements 6 an appearance identical to that of an applique made of another material and attached to face 4*p* of plate 2**.

To obtain such a dial, the method employed is that illustrated by FIGS. 1–4, representing the successive stages of manufacture of the dial of which a portion is shown in FIG. 5.

In FIG. 1, it will be seen that dial plate 2 is at first plane, consisting of an aluminum plate 14 covered with an anodized coating 16 at least on its upper surface **4*p*, intended to form the visible face of the dial. Owing to the anodizing process used, the back surface of the dial is likewise covered with an anodized coating 16*a* identical to coating 16**, but this is merely a consequence of the process used and has no importance for the result obtained.

FIG. 2 shows the following stage of manufacture of the dial. It will be seen that by means of embossing, an element 6 has been produced in relief in plate 2, the top surface **8*p* of element 6 still being covered by the first anodized coating 16, designated as 16' on element 6, whereas side surfaces 10*n* of element 6 allow the bare aluminum forming the body 14 of plate 2** to appear. The letters added to the reference numeral designating surfaces correspond to the condition of those surfaces, with *p* designating the condition resulting from a first treatment (first anodic oxidation), *n* designating the surface laid bare, and *d* designating the condition resulting from a second treatment (second anodic oxidation) which will be explained further on. Owing to the excellent adhesion of the anodized finish (or coloring) to the aluminum, the embossing of the raised portion 6 does not damage the anodized surface at those points where there is a break in continuity of the anodized coating.

Next, as shown in FIG. 3, the anodized coating is removed from the top surface of element 6, preferably by diamond polishing, so that element 6 then exhibits a top surface **8*n* where the solid aluminum 14', i.e., the portion of aluminum plate 14 forming element 6, is laid bare. In this condition, the raised elements already look like appliques standing out from a background formed by anodized surface 4*p***. However, these applique-like elements would actually have the appearance of raw aluminum appliques (non-treated surfaces), so that in this stage, the dial plate could not be considered finished for any but a very cheap dial—with pseudo-appliques made of aluminum—which might be suitable for a low-quality watch but would not be advisable owing to the likelihood of rapid deterioration of the raw aluminum surfaces.

Therefore, in the method described here, a new anodizing treatment is carried out after the stage illustrated by FIG. 3. Because the first anodized coating 16 forms an insulating layer which does not allow the galvanic treatment current to pass, this new anodizing treatment will be applied only to the portions where the aluminum is laid bare, i.e., to top surface 8*n* and side surfaces 10*n* (and 10'*n*, not shown in FIGS. 1–4) of raised element 6. After this second treatment, the dial plate as shown in FIG. 4 is obtained, top surfaces 8*d* and lateral faces 10*d* (as well as end faces 10'*d*, not shown in FIG. 4) of element 6 being covered with a new anodized coating 18. Coating 18, resulting from the second anodizing treatment, will naturally be of a different color (or at least a different aspect, shade, brightness, etc.) from coating 16 forming the base surface 4*p* of the dial plate. Thus the dial partially shown in FIG. 5 is obtained, and a very great variety of color combinations may be envisaged (e.g., gilt elements in relief against a blue background, green or red elements against a white background, etc). It should be noted that the treatments which form layers 16 and 18, respectively, and especially the second treatment determining the aspect of raised elements 6, might consist solely of a treatment which stabilizes the surface of the aluminum (e.g., the so-called "filling-up" treatment which closes the pores of the aluminum) without modifying, or without notably modifying, the hue of the material itself. Thus beautiful dials have been obtained, for example, with silver-colored (aluminum) indicia in relief on a red or brown background.

In order for the second anodizing treatment to be carried out, the dials must have an additional uncovered surface somewhere to provide a path of access for the electric current of the galvanic treatment. In the prototypes produced, therefore, at the same time that the top surfaces of the raised elements were diamond polished to lay them bare, the same operation was performed on the edge surface 12 (FIG. 5) of the periphery of the dial, through which contact could then be established with the conductors used for the galvanic anodizing treatment. The result is that edge surface 12 is dyed in the same way as top surfaces 8 and side surfaces 10 of raised elements 6, but this has no significance at all because edge surface 12 of the dial is not even visible in the watch.

In order to make the dials still more attractive, it is possible to take advantage of the properties of the aluminum to form "marbled" designs 20 on surface 4*p* of the dial face, (as shown on FIG. 5). For this purpose, even before carrying out the anodizing of coating 16 to obtain the stage shown in FIG. 1, certain portions of the surface may be masked, and then only the unmasked portions subjected to an etching process, so as to form shiny areas (not etched because they are masked) and mat areas (etched), the configuration of which, by means of the shiny/mat contrast, provides a design which, to the eye, even gives the impression of being in relief. This design 20 remains after the anodization which forms coating 16 and is to be found on the background of the finished dial, to which it gives a very fine and highly luxurious aspect. If this marbling were initially likewise formed on the parts of the plate which are then embossed for forming the relief elements 6, it would, of course, be eliminated by the diamond polishing, so that no marbling would appear on the relief elements in the finished dial. This marbling 20, which is obtained by an additional treatment phase preceding the treatment phases illustrated by FIGS. 1–4, is not shown in these four figures, but in FIG. 5, which illustrates the finished dial.

It will be obvious that the method which has just been described for obtaining indicia in relief having the appearance of true appliques might equally well be applied, without departing from its concept, to other embodiments of the method, even to embodiments in which the base material would be some other material (aluminum alloys) capable of undergoing an anodizing treatment or perhaps another treatment giving good tenacity and an incrusting nature equivalent to those of an anodizing treatment. The important thing in the present concept is to obtain bared side surfaces by means of embossing carried out after the application of a first basic surface treatment, it being understood that this treatment must be such that the embossing does not damage the already-treated base surface in any way, particularly at the lines of demarcation at the foot of these bared side surfaces.

Finally, it will be noted that as is necessary for securing the dial in most watches, dial-feet are subsequently attached to the back of the dial. It has proved possible to attach brass dial-feet in such a way that absolutely no damage, be it ever so slight, is done to the finish and appearance of the visible face. It has been found preferable not to attach the dial-feet until the visible surface has been finished, for these feet, made of brass, would be bound to suffer from the chemical and galvanic treatment applied to the aluminum. It would naturally be conceivable to have dial-feet made of aluminum, which would be more difficult but not impossible to attach in a suitable manner, instead of brass dial-feet, thus allowing them to be attached before the various chemical, galvanic, and mechanical treatments are carried out.

What is claimed is:

1. A method of manufacturing a watch dial with symbols in relief, comprising the following steps:

taking a plate made of an aluminum-base material capable of undergoing anodizing, intended to form a dial and not yet provided with reliefs, applying to said plate a basic surface treatment of anodizing which converts said material at the surface of said plate into an oxidized layer having an incrusted nature and tenacity, and which gives said surface a predetermined aspect, subsequently causing said plate to undergo an embossing operation for forming relief elements corresponding to the desired symbols, said embossing causing said aluminum-base material to appear bare, free of oxidizing, on all visible side surfaces of said relief embossed elements, and said incrusted nature and tenacity of said oxidized layer caused by said anodizing ensuring a clear and crackless demarcation between said bare side surfaces and the remaining anodized surface of said plate at the foot of said side surfaces, removing said oxidized layer applied by said basic surface treatment of anodizing from the upper surface of said relief elements, applying to said bared upper and side surfaces of said elements in relief a second surface treatment of anodizing, imparting a particular aspect different from the one given by said basic surface treatment of anodizing, said second surface treatment of anodizing, carried out without efffect on the parts of surfaces not laid bare, affecting said bared upper and side surfaces of said elements in relief and conferring upon them, by causing said particular aspect to appear likewise on both said upper and said side surfaces of said relief elements, an appearance of real appliques, of a character provided by said second surface treatment of anodizing, standing out from a background having said predetermined aspect given by said first basic surface treatment of anodizing.

2. A method of manufacturing in accordance with claim 1, wherein both said first basic surface treatment and said second surface treatment are anodizing treatments providing a coloring, said second surface treatment of anodizing providing a coloring different from the one provided by said first basic surface treatment.

3. A method of manufacturing in accordance with claim 1, wherein either said first basic surface treatment of said second surface treatment is an anodizing treatment providing a coloring, the other said treatment being an anodizing treatment providing a finish and preserving at least partially the aspect of said aluminum-base material.

4. A method of manufacturing in accordance with claim 1, wherein said plate is made of aluminum, further comprising a step of laying bare a peripheral edge of said plate for providing an electric conduction path for said second surface treatment of anodizing.

5. A method of manufacturing in accordance with claim 1 wherein said removing of said oxidation layer from said upper surface of said relief elements is carried out by a grinding and/or polishing operation.

6. A method of manufacturing in accordance with claim 5, further comprising an additional step, carried out previous to said basic surface treatment of anodizing, of establishing on said plate, by selectively masking certain parts thereof and etching the unmasked remaining parts, a design appearing in the form of smooth non-etched portions and rough etched portions, said design being removed from said upper surface of said relief elements and remaining as a marbling aspect on the rest of the upper face of said plate in the finished state of the dial, after the carrying out of said surface treatments of anodizing and of said embossing and said grinding and/or polishing operations.

7. A watch dial obtained by carrying out the method of claim 1, comprising a plate of aluminum-base material exhibiting symbols embossed in relief, said symbols in relief having upper and side surfaces anodized with a first aspect, the rest of the face of said plate being anodized with a second aspect.

8. A watch dial in accordance with claim 7, wherein at least one of said first and second aspects comprises a particular coloring.

9. A method of manufacturing a watch dial with symbols in relief, comprising the following steps:

taking a plate made of an aluminum-base material capable of undergoing anodizing, intended to form a dial and not yet provided with reliefs, establishing on an upper face of said plate, by selectively masking certain parts thereof and etching the unmasked remaining parts, a design appearing in form of smooth non-etched portions and rough etched portions, applying to said plate a basic surface treatment of anodizing which converts said material at the surface of said plate into an oxidized layer having an incrusted nature and tenacity, and which gives said surface a predetermined aspect subsequently causing said plate to undergo an embossing operation for forming relief elements raised from said upper face and designed to correspond to the desired symbols, said embossing causing said aluminum-base material to appear bare, free of oxidizing, on all visible side surfaces of said relief embossed elements, and said incrusted nature and tenacity of said oxidation caused by said anodizing ensuring a clear and crackless demarcation between said bare side surfaces and the remaining anodized surface of said plate at the foot of said side surfaces, removing by a fine grinding or polishing operation said oxidized layer applied by said basic surface treatment of anodizing from the upper surface of said relief elements, said grinding or polishing operation eliminating at the same time said smooth/rough design from said upper surface of said relief elements, applying to said bared upper and side surfaces of said elements in relief a finishing treatment giving them a particular aspect, said finishing treatment affecting said bared upper and side surfaces of said elements in relief and conferring upon them, by causing said particular aspect to appear likewise on both said upper and said side surfaces of said relief elements, an appearance of real appliques standing out from a background having said predetermined aspect given by said first basic surface treatment of anodizing, said background also exhibiting said design in the form of smooth non-etched portions and rough etched portions, which remains, only on said background in spite of the subsequent carrying out of said surface treatment of anodizing, as a marbling in the aspect of the finished dial.

* * * * *